United States Patent [19]

Valkestijn et al.

[11] Patent Number: 4,607,195

[45] Date of Patent: Aug. 19, 1986

[54] PICTURE DISPLAY DEVICE COMPRISING A POWER SUPPLY CIRCUIT AND A LINE DEFLECTION CIRCUIT

[75] Inventors: Leonardus A. A. Valkestijn; Fransiscus M. J. Nooijen; Christianus H. J. Bergmans, all of Eindhoven, Netherlands

[73] Assignee: U.S. Philips Corporation, New York, N.Y.

[21] Appl. No.: 565,955

[22] Filed: Dec. 27, 1983

[30] Foreign Application Priority Data

Mar. 21, 1983 [NL] Netherlands ................. 8300998

[51] Int. Cl.⁴ ............................................. H01J 29/74
[52] U.S. Cl. .................................... 315/410; 315/408; 315/411
[58] Field of Search ............... 315/399, 408, 409, 410, 315/411, 397

[56] References Cited

U.S. PATENT DOCUMENTS

| | | | |
|---|---|---|---|
| 3,912,972 | 12/1975 | Otten et al. | 315/408 |
| 3,950,674 | 4/1976 | Joosten et al. | 315/389 |
| 3,999,102 | 12/1976 | Gent et al. | 315/410 |
| 4,099,101 | 7/1978 | Teuling | 315/410 |
| 4,182,978 | 1/1980 | Boekhorst | 315/408 |

Primary Examiner—Theodore M. Blum
Assistant Examiner—David Cain
Attorney, Agent, or Firm—Thomas A. Briody; William J. Streeter; Leroy Eason

[57] ABSTRACT

A power supply and scanning line deflection circuit for a picture display device. The power supply circuit comprises an inductance and a switch which switches at line frequency, the inductance forming part of a resonant network during the cut-off period of the switch. The line deflection circuit comprises another switch which also switches at line frequency and a line deflection coil which during the cut-off period of the switch, which substantially coincides with the retrace period, forms part of a resonant network which also comprises an inductance. A transformer winding is coupled to one of the inductances. During the cut-off period of the switch pulses are developed across this transformer winding which are rectified for generating a supply voltage for a variable load. To reduce the internal impedance of the voltage source thus formed, which may serve, for example as the high voltage supply, means are provided for connecting, at least during a portion of the scanning line retrace period, the transformer winding to the other inductance, such connection conducting substantially no current during the scanning line trace period.

9 Claims, 6 Drawing Figures

PICTURE DISPLAY DEVICE COMPRISING A POWER SUPPLY CIRCUIT AND A LINE DEFLECTION CIRCUIT

BACKGROUND OF THE INVENTION

1. Field of the Invention

The invention relates to a power supply and scanning line deflection circuit for a picture display device, said power supply circuit comprising, connected between the terminals of a first voltage source, the series arrangement of a first switch switchable at line frequency and a first inductance, the first inductance forming part of a first resonant network during the cut-off period of the first switch, the line deflection circuit comprises a line deflection coil and, connected between the terminals of a second voltage source, the series arrangement of a second switch switchable at line frequency and a second inductance, the line deflection coil and the second inductance forming part of a second resonant network during the cut-off period of the second switch and which substantially coincides with the retrace period. Connected to a transformer winding coupled to one of the inductances is rectifying circuit including a rectifier for rectifying the pulses present across the transformer winding during the cut-off period of the switch which is in series with the relevant inductance, for generating a supply voltage for a varying load.

2. Description of the Prior Art

Such a circuit comprising a power supply circuit and a line deflection circuit is disclosed in U.S. Pat. No. 3,999,102. Therein; the supply voltage is stabilised against variations of the first supply voltage which is, for example, derived from the power mains, but keeping the supply voltage substantially constant for the varying load causes problems, particularly if the variations are fast and relatively large. This is caused by the fact that the rectifying circuit can be considered to be a source having a rather higher internal impedance as energy is stored in the inductance to which the transformer winding is coupled, in a time interval preceding the interval in which the energy is consumed by the load, which energy cannot vary rapidly, and as the transformer provided by the said inductance and the winding has a rather large leakage inductance. Because of this high internal impedance the rectified voltage decreases when the load increases, which may have disadvantageous results. If, for example this voltage is the high voltage for the final anode of a picture display tube, the load being formed by the beam current within the tube, then the high voltage assumes a low value in those portions of the displayed picture which have a high luminance, these portions then being of a larger size on display than portions having a lower luminance, this phenomenon being the co-called "picture breathing", which entails a loss of picture quality.

The invention has for its object to provide a power supply to scanning line deflection circuit of the above-mentioned type in which the internal impedance of the supply voltage source for the variable load is reduced using only few additional means, such that a considerable variation of the load does not produce a large variation of the value of the voltage applied thereto and to that end the picture display device according to the invention is characterized in that it further comprises a connection for connecting, at least during the conduction period of the rectifier, a point of the transformer winding or of a winding coupled thereto to a point of the inductance not coupled to the transformer winding or of a further winding coupled to the said inductance, this connection being substantially currentless in the non-loaded state of the rectifying circuit.

SUMMARY OF THE INVENTION

Preferably, the circuit according to the invention is characterized in that the said connection is connected to the junction of the second inductance and the second switch. The circuit may further be characterized in that the said connection is connected to a point on the transformer winding to which winding the rectifier is connected as a retrace rectifier.

The device may advantageously be characterized in that the said connection is connected to a point on a winding coupled to the first inductance, to which winding a rectifier is connected as a trace rectifier for generating a voltage across a smoothing capacitor which forms the second voltage source. The second supply voltage source is then indeed derived from the first supply voltage source, but the voltage thereof is only affected to a limited extent by the load on the power supply circuit.

The circuit may further be characterized in that the winding coupled to the first inductance is connected by means of one end to a terminal of the smoothing capacitor at which the voltage of the second voltage source is available, the other end being connected to a first electrode of the trace rectifier, while the other terminal of the smoothing capacitor and the second electrode of the trace rectifier are interconnected, the said connection being connected to the junction of the winding and the first electrode of the trace rectifier.

The circuit device in accordance with the invention may also be characterized in that the said connection comprises a controllable switch which is conductive at least during the retrace period, or may be characterized in that the said connection includes a diode. Preferably the circuit is characterized in that the said connection comprises a capacitor.

The invention will now be further described by way of example with reference to the accompanying drawing

DESCRIPTION OF THE PREFERRED EMBODIMENT

Figure 1:
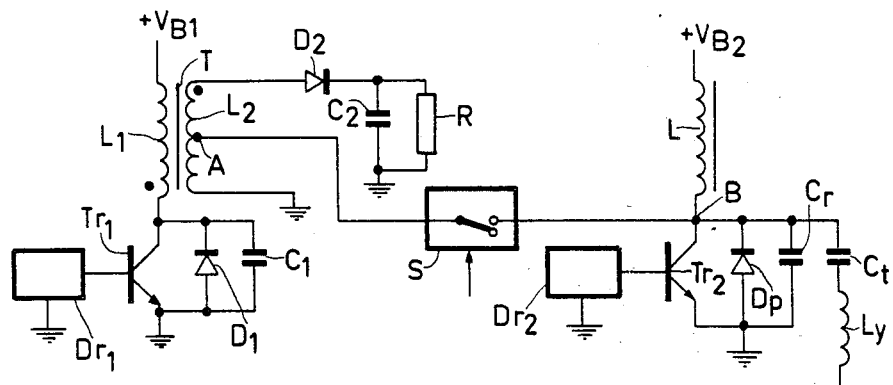
FIG. 1 shows a first embodiment of the picture display device circuit according to the invention.

The diagram of FIG. 1 shows a power supply circuit and a line deflection circuit for a picture display device, not shown, for example a television receiver, both such circuits being of a known construction. The power supply circuit comprises an inductance $L_1$ which forms the primary winding of a supply transformer T. One end of working $L_1$ is connected to the positive terminal of a supply voltage source $V_{B1}$ which, for example is derived, by rectification, from the electric power mains, and the other end is connected to the collector of an npn switching transistor $Tr_1$, to the cathode of a diode $D_1$ and to a tuning capacitor $C_1$. The emitter of transistor $Tr_1$, the anode of diode $D_1$ and that terminal of capacitor $C_1$ not connected to winding $L_1$ and also the negative terminal of source $V_{B1}$ are connected to ground. One end of a secondary winding $L_2$ of transformer T is also connected to ground while the anode of a rectifier $D_2$ is connected to the other end. A smoothing capacitor $C_2$ and a load which may be represented by a resistor R are arranged between the cathode of diode $D_2$ and ground. The winding senses of windings $L_1$ and $L_2$, which are denoted in FIG. 1 in customary manner by means of dots, and the conduction direction of rectifier $D_2$ have been chosen such that transistor $Tr_1$ and rectifier $D_2$ cannot carry current simultaneously. Further secondary windings, which are not shown for the sake of simplicity, may be wound on the core of transformer T.

In operation, transistor $Tr_1$ is alternately adjusted to the conducting and the non-conducting state in response to the signal from a driver stage $Dr_1$ connected to its base. In a portion of the time either diode $D_1$ or transistor $Tr_1$ is conductive, causing winding $L_1$ to be connected to the voltage of source $V_{B1}$. As a result thereof there flows through winding $L_1$ and first through diode $D_1$ a substantially linear current which reverses its direction at a determined instant and then flows through transistor Tr. In the remaining period of the time both transistor $Tr_1$ and diode $D_1$ are non-conductive, as a result of which a substantially cosinusoidal oscillation is produced at the collector of the transistor having a duration which is determined by the resonant frequency of the resonant network provided by the inductances and the capacitances of the circuit. This oscillation is ended at the instant at which the voltage at the collector of transistor $Tr_1$ becomes zero again, as a result of which diode $D_1$ becomes conductive and keeps this voltage substantially at the zero level. A similar oscillation is present at the anode of rectifier $D_2$ and is rectified by the rectifier to generate a d.c. voltage across capacitor $C_2$ for the benefit of resistor R.

Due to the energy consumption by resistor R, the current through winding $L_2$ and consequently also the current through winding $L_1$ has a direct current component. At the primary side of transformer T this component flows in the direction of the switch provided by transistor $Tr_1$ and diode $D_1$ and causes energy to be stored in the core of transformer T, which energy produces during the cut-off period of switch $Tr_1$, and diode $D_1$ a current at the secondary side of the transformer for the benefit of resistor R and to recharge capacitor $C_2$. The voltage across resistor R remains approximately constant with small variations of the load if the voltage from source $V_{B1}$ is constant. The value of resistor R may, however, vary considerably and rapidly, for example, when the load is in the form of the power consumption of a class B-audio section or when the voltage across the load is the high voltage for the final anode of a picture display tube. In the latter case the power consumed is the beam current within the tube, which beam current, in dependence on the picture content, may vary between zero in the case of a black detail on the display screen, and a high value in the case of a very bright detail on the display screen. The described power supply circuit cannot adequately follow such a variation because of the fact that the circuit is a flyback converter and has inherently a high internal impedance. The energy consumed by resistor R is actually stored in transformer T in an earlier time period and the stored energy cannot vary as needed in an adequately fast manner. In addition, the transformer has a rather large transformer ratio, so that the leakage inductance, particularly in the case of d.c. isolation between ground at the primary and ground at the secondary side, is considerable. This also holds for the case in which transformer T is replaced by an auto-transformer.

The line deflection circuit of FIG. 1 comprises a line deflection coil $L_y$ for deflecting in the horizontal direction the electron beam(s) generated in the picture display tube, which coil is arranged in series with a trace capacitor $C_t$. A retrace capacitor $C_r$ is in parallel with the arrangement $C_t$, $L_y$ formed. One of the junctions formed is connected to ground, while the other junction is connected to the cathode of a parallel diode $D_p$ and to the collector of an npn switching transistor $Tr_2$. The anode of diode $D_p$ and the emitter of transistor $Tr_2$ are connected to ground. The junction B of components $Tr_2$, $D_p$, $C_r$ and $C_t$, which junction is remote from ground, is connected to an inductance L, whose other end is connected to the positive terminal of a supply voltage source $V_{B2}$ whose negative terminal is connected to ground. Source $V_{B2}$ may also be derived from the electric power mains.

In operation, transistor $Tr_2$ is alternately adjusted to the conducting and the non-conducting state in response to the signal from a driver stage $Dr_2$ connected to its base. This is effected at line frequency, i.e. at approximately 15 kHz. In a large portion of the trace period portion of the line period; either diode $D_p$ or transistor $Tr_2$ is conductive, causing coil $L_y$ to be connected to the (trace) voltage of capacitor $C_t$. As a result thereof there flows through coil $L_y$ and first through diode $D_p$ the line deflection current which reverses its direction approximately halfway through the trace period and then flows through transistor $Tr_2$. In the remaining part of the line period, the retrace period, both transistor $Tr_2$ and diode $D_p$ are non-conductive. A substantially cosinusoidal oscillation having a duration which is determined by the resonant frequency of the resonant network provided by the inductances and the capacitances of the circuit, is produced at point B. This oscillation is ended at the instant at which the voltage at point B becomes zero again, as a result of which diode $D_p$ becomes conductive and keeps this voltage substantially at the zero level.

In a lossless circuit the current flowing through inductance L and through the conducting deflection switch $Tr_2$, $D_p$ would also reverse its direction at the centre instant of the trace period. However, because of the losses, more current is withdrawn from source $V_{B2}$ than is returned to it. Consequently, a direct current component flows to the switch through inductance L, which implies that the current through the inductance reverses its direction prior to the said instant. As a line deflection circuit, and more specifically the deflection coil, usually has few losses, the said component is small compared with the amplitude of the line deflection current. The supply energy produced thereby is stored in inductance L and is many times smaller than the energy provided by the deflection current, which energy moves through the resonant network. During the retrace period, i.e. a period of time in which the voltage at point B is unequal to zero, this supply energy is fed to the resonant network.

In the event of a very small load on the rectifying circuit comprising rectifier $D_2$, that is to say at a very high value of resistor R, rectifier $D_2$ conducts during a very short period of time around the instant at which the oscillation present across winding $L_2$ reaches its maximum value. In the event of a very high load, that is to say at a low value of resistor R, rectifier $D_2$ conducts for a longer period of time causing the peak of the oscillation to be clipped, while the voltage across resistor R is lower. The oscillation across the further windings of transformer T is also clipped. Compensation for this effect, whereby consequently the internal impedance of the rectifying circuit is reduced, is however obtained because of the fact that point B is connected to a point A of the power supply circuit by means of a controllable switch S. Switch S is controlled such that it conducts during the retrace period of the line deflection current, at least during an interval comprising the conduction period of rectifier $D_2$, and that it is non-conducting during the trace period. This results in the line deflection circuit furnishing energy to the rectifying circuit. This is possible since the first-mentioned circuit behaves as a source of small internal impedance because of the large quantity of energy stored in the deflection resonant network. The retrace pulse at point B and consequently the different waveforms in the line deflection circuit are affected to a small extent only by the coupling provided between the two circuits, while the pulse present across winding $L_2$ is given a larger amplitude than would otherwise be the case, which results in that the voltage across resistor R is constant to an improved extent.

The point A to which point B is connected in the retrace period may be a point on winding $L_2$ at which in the non-loaded state, in which resistor R has a very high value, a pulse is present which has approximately the same maximum value as the retrace pulse at point B. This is shown in FIG. 1. It may alternatively be a similar point of a secondary winding on transformer T which is tightly coupled to winding $L_2$. It may alternatively be a point on winding $L_1$ provided the coupling between windings $L_1$ and $L_2$ is not too loose. A condition for an adequate operation is that the pulses in both circuits reach the maximum values approximately simultaneously. This implies that the signal from driver stage $Dr_1$ is also a signal of the line frequency and that it is in a substantially fixed relationship with the signal from driver stage $Dr_2$. For this purpose the signals applied to stages $Dr_1$ and $Dr_2$ may be derived from one specific source, for example a line oscillator. The control signal which operates switch S may also be derived from this source; it may alternatively be a retrace pulse present in the line deflection circuit. It is furthermore also necessary for the pulses in both circuits to be substantially of the same shape in the non-loaded state of the rectifying circuit, which means that the cut-off period of switch $Tr_1$, $D_1$ is approximately equal to the cut-off period of switch $Tr_2$, $D_p$, i.e. approximately 12 $\mu$s for a line period of 64 $\mu$s, and substantially coincides therewith as otherwise an unnecessary current might flow through the connection between points A and B. To that end the capacitance of capacitor $C_1$ must have the proper value and transistors $Tr_1$ and $Tr_2$ must be made non-conductive substantially simultaneously. In these circumstances, with a very high value of resistor R substantially no current flows through the connection comprising the closed switch S at the instant at which the pulses reach the maximum values. At a low value of resistor R a brief current flows through the connection which replenishes the charge of capacitor $C_2$ via rectifier $D_2$.

Instead of point B, a suitable point on inductance L or a point on a winding coupled thereto may be chosen for the said connection. Transistor $Tr_2$ may be supplied with its control signal in known manner by means of an auxiliary winding of transformer T, it being necessary that measures are taken in the event that the turn-off instants of the two transistors do not coincide, due to the relatively long storage time thereof.

The arrangement of FIG. 1 has the disadvantage that the switch S which is, for example, a switching transistor is expensive. It is cheaper to replace this transistor by a diode whose anode is connected to point B and the cathode to point A, which diode need not be controlled, but this has the same disadvantage as a direct connection, namely that current also flows therethrough in the trace period when the voltage at one side of the connection, more specifically at the line deflection circuit side in the case a diode is used, is higher than the voltage at the other side. This would be the case in FIG. 1 as point B is substantially at the zero level during the trace period, while point A has a negative potential, as the average value of the voltage at this point is zero. The current flowing through the diode during the trace period, produces a dissipation in the ohmic resistors provided in its path. This is, however, prevented from occurring if the lower end of winding $L_2$, as shown in the drawing, is not connected to ground but to a compensating d.c. voltage source. It is alternatively possible to replace switch S by a capacitor which blocks the d.c. voltage and has such a small capacitance that its impedance is low for the short current pulse to capacitor $C_2$ in the retrace period and is high in the remaining time of the period, so that a compensating current flowing therethrough remains small. It will be obvious that other, more complicated coupling elements, for example networks, which satisfy all requirements may be chosen. An LC-series network, for example, has a series resonance, which may be desirable in certain circumstances.

Figure 2:
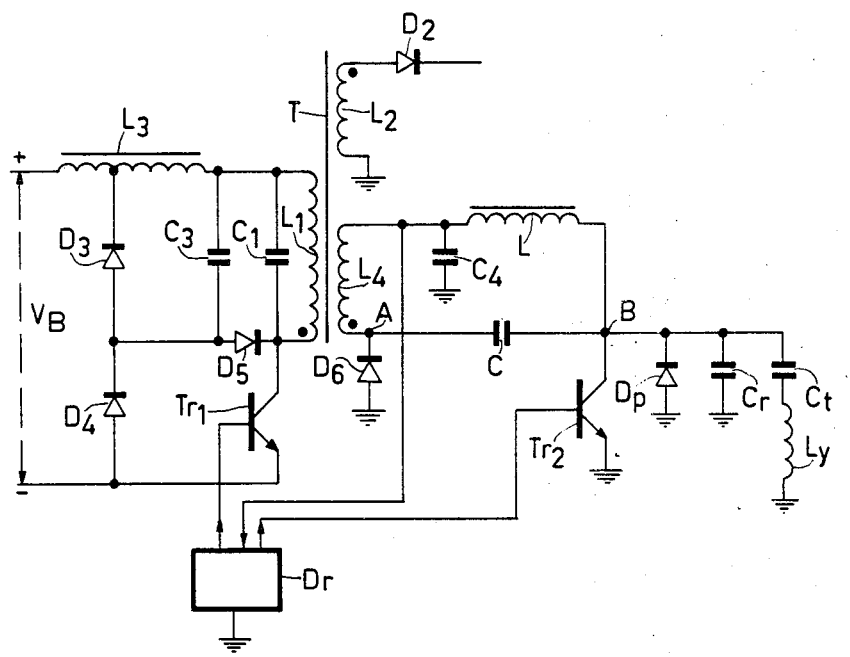
FIG. 2 shows a second embodiment of the picture display device circuit according to the invention.

FIG. 2 shows an embodiment of the device according to the invention which is suitable for use with a non-constant supply voltage source. The deflection circuit in FIG. 2 is the same as that in FIG. 1, while the power supply section is substantially the same as disclosed in the publication "Philips, Electronic components and materials: Technical Publication 006", published in 1981. It comprises the series arrangement of two diodes $D_3$ and $D_4$. The cathode of diode $D_3$ is connected to a tap of an inductance $L_3$ one end of which is connected to the positive terminal of a d.c. voltage source $V_B$. The anode of diode $D_3$ and the cathode of diode $D_4$ are connected to the anode of a further diode $D_5$ and to a capacitor $C_3$. The other side of capacitor $C_3$ is connected to the other end of inductance $L_3$ and to winding $L_1$. The cathode of diode $D_5$ is connected to the other end of winding $L_1$ and to the collector of transistor $Tr_1$. Capacitor $C_1$ is in parallel with winding $L_1$, and the emitter of transistor $Tr_1$ and also the anode of diode $D_4$ are connected to the negative terminal of source $V_B$.

FIG. 2 shows a secondary winding $L_4$ of transformer T. Connected in parallel therewith is the series arrangement of a rectifier $D_6$ and a smoothing capacitor $C_4$. The winding sense of winding $L_4$ and the conduction direction of rectifier $D_6$ are chosen such that the voltage generated across capacitor $C_4$ is positive and that rectifier $D_6$ is conducting in the trace period. By means of transformer T d.c. isolation from mains is effected. The voltage of capacitor $C_4$ is fed back to a driver stage Dr, which applies pulses of line frequency to the base of transistor $Tr_1$ and also to the base of transistor $Tr_2$, a mains isolating transformer, not shown, being included in the drive line of transistor $Tr_1$. The conduction period of transistor $Tr_1$ is controlled in known manner in dependence on the voltage of capacitor $C_4$ as a result of which this voltage and consequently also the voltage across capacitor $C_3$ is kept substantially constant. A condition is that transistor $Tr_1$ conducts, as is also the case in FIG. 1 with certainty at and after the instant at which the current through winding $L_1$ reverses. An analysis of the prior art circuit at the primary side of transformer T shows that during the entire trace period the voltage across winding $L_1$ is substantially equal to the voltage across capacitor $C_3$, because either diode $D_5$ conducts, or transistor $Tr_1$ and diode $D_4$ are conducting so that the voltage across winding $L_4$ is substantially constant during the trace period.

A load can be connected to capacitor $C_4$. The supply energy consumed by this load is provided by a current which also flows through winding $L_4$ and capacitor $C_4$. This current can only flow during the trace period. The choice of trace rectification provides that the current through winding $L_4$ flows during the period of time when the supply switch formed by transistor $Tr_1$ and diode $D_4$ and diode $D_5$ conducts. So this energy is not stored in transformer T but is directly derived from capacitor $C_3$. This has the advantageous effect that the transformer may have a comparatively small core and has less energy loss. In addition, since the voltage across capacitor $C_3$ is substantially constant thanks to the control the voltage across capacitor $C_4$ is also substantially constant in the case of variations of the load connected thereto. A voltage which is generated by means of retrace rectification, for example the voltage obtained with the aid of winding $L_2$ and rectifier $D_2$ is, in contrast therewith, not constant in the case of variations of the load connected thereto, and that for reasons which have already been described in the foregoing, while these variations have little influence on the voltage of capacitor $C_4$. Winding $L_2$ is the high voltage winding, the high voltage generated with the aid of rectifier $D_2$ is smoothed by parasitic capacitances.

One end of winding $L_4$ may be connected to ground, while the other end may be connected to capacitor $C_4$ via rectifier $D_6$. In FIG. 2 however the first-mentioned end is connected to the cathode of rectifier $D_6$, whose anode is connected to ground, while the other end is connected to capacitor $C_4$. That terminal of capacitor $C_4$ not connected to winding $L_4$ is connected to ground. Also in this case a substantially constant positive supply voltage is generated across capacitor $C_4$. Inductance L is connected to this voltage. The other side of inductance L is connected to the point B of the line deflection circuit. From this it can be seen that the voltage from capacitor $C_4$ is the supply voltage source for the line deflection circuit and that the retrace pulses present at point B have a substantially constant amplitude.

Retrace pulses are also present across the windings of transformer T. The amplitude of these pulses depends however, on the beam current. The retrace pulses present at the junction A of winding $L_4$ and rectifier $D_6$ are clamped to ground by the rectifier. If the beam current is zero, that is to say the value of the resistor R R mentioned in the description with reference to FIG. 1 is very high, then the pulses at points A and B are substantially identical, as the duration thereof, which is predominantly determined by the tuning by means of capacitor $C_r$ and $C_1$, respectively is substantially the same, so the shape is also substantially the same, while the amplitude which is higher by a given factor than the average value, i.e. the voltage of capacitor $C_4$, is also substantially the same. If the beam current is not zero then the peaks of the pulses at point A are clipped. This does however not occur if points A and B, as are also the similarly denoted points in FIG. 1, are interconnected during the retrace period. The substantially non-distorted pulses at point B are also present at point A and consequently also at the anode of rectifier $D_2$, as a result of which the decrease in the high voltage due to the high internal impedance of the high voltage source is largely compensated for. This also holds for other retrace rectifying circuits, not shown in FIG. 2. During at least a portion of the retrace period an additional current flows from the network formed by elements $C_r$, $C_t$ and $L_y$ to point A, to winding $L_4$ and to capacitor $C_4$. After the retrace period has ended current flows through rectifier $D_6$ and winding $L_4$ to capacitor $C_4$.

During the trace period the voltages at points A and B are only approximately zero. Actually, the voltage at point A is somewhat negative while the voltage at point B has approximately the same negative value in the first half of the trace period and then becomes somewhat positive. These points can be interconnected by means of a controlled switch, not shown, which is in the cut-off state during at least the second half of the trace period and, during the conduction time of rectifier $D_2$ conducts with certainty in the retrace period. As the voltage difference between points A and B is small, this switch may be provided by a diode; the anode of which is connected to point B and the cathode to point A. The dissipation therein and in the circuit comprising ohmic resistances of winding $L_4$ and inductance L is low. Because of the said diode, diode $D_6$ with which two series-arranged diodes having the same conduction direction are arranged in parallel, may be omitted.

In practice, a capacitor C as, shown in FIG. 2, produced a satisfactory result when used as a coupling element between points A and B. The value of the capacitance thereof was not critical, approximately 22 nF was chosen. Herewith a considerable reduction in the internal impedance of the high voltage source, more specifically by a factor of 3; was obtained to a value lower than $1\Omega$. In this practical embodiment the voltage across capacitor $C_4$ was approximately 150 V, so that the amplitude of the pulses at points A and B was approximately 1200 V and transformer T, also when comprising secondary windings not shown in FIG. 2, was comparatively small. It was a what is commonly referred to as a mini-diode split transformer, i.e. a transformer in which the rectifier $D_2$ in the form of a plurality of rectifiers and the winding $L_2$ divided into winding sections form one whole.

FIGS. 1 and 2 show only those components which are important for the invention and further elements have been omitted for the sake of simplicity. A linearity controller is such an element. A further element not shown is an east-west modulator for modulating at field frequency the amplitude of the line deflection current. With this modulator the geometry of the displayed picture can be improved, while its width can be adjusted. A known east-west modulator is the diode modulator described in Netherlands Patent Specification No. 152,733 (PHN 6734). Herein the amplitude of the retrace pulses does not vary at field frequency at point B, so that the high voltage is not affected by the modulation.

Also the nature of the switches is not important for the invention. Both diode $D_1$ and diode $D_p$ may be omitted if the base collector diode of transistor $Tr_1$ and $Tr_2$, respectively can function as parallel diodes. The transistors can be replaced by other switching elements, for example gate turn off switches.

Figure 3:
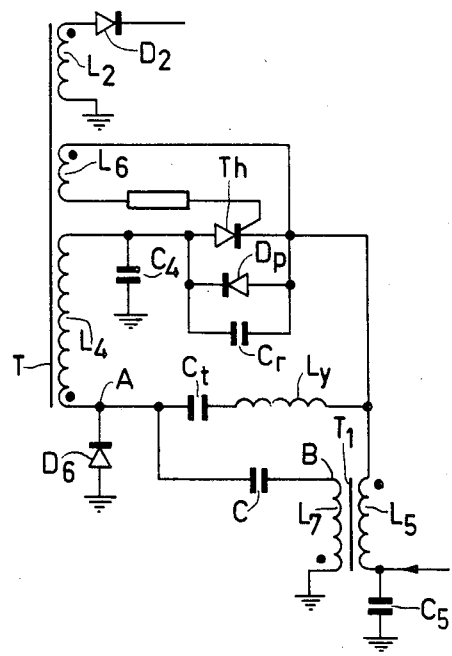
FIG. 3 shows a third embodiment of the picture display device circuit according to the invention.

It will be obvious that the measure according to the invention can be employed for variations of the devices shown in FIGS. 1 and 2. FIG. 3 shows such a variation as regards the line deflection portion of the device, which portion has a construction as described in Netherlands Patent Application No. 8,202,499. Herein the portion, not shown, at the primary side of transformer T is the same as in FIG. 2. In FIG. 3 coil $L_y$, capacitor $C_t$, winding $L_4$ and the deflection circuit form part of a loop, the deflection switch being provided by a thyristor Th and the diode $D_p$ arranged in anti-parallel therewith. Capacitor $C_r$ is in parallel with switch Th, $D_p$. Capacitor $C_4$ and diode $D_6$ are connected in the same way as shown in FIG. 2. One side of an inductance $L_5$ is connected to the junction of elements $L_y$, Th, $D_p$ and $C_r$ and the other side to a capacitor $C_5$, the other side of this capacitor $C_5$ being connected to ground. The drive means for thyristor Th comprises a secondary winding $L_6$ of transformer T for setting the thyristor to the state in which it conducts prior to the centre instant of the trace period of the line deflection current. A positive voltage is applied to capacitor $C_5$ to adjust the width of the picture, which voltage may contain a field-frequency component.

The retrace pulses at point A which are clamped at ground potential by diode $D_6$ have a positive polarity. As the average value of the voltage at the junction of elements $L_y$, Th, $D_p$, $C_r$, $L_5$ and $L_6$ is positive, the retrace pulses have in this junction however the negative polarity. An inductance $L_7$ is coupled to inductance $L_5$. So inductances $L_5$ and $L_7$ are two windings of a small transformer $T_1$. One end of winding $L_7$ is connected to ground. The winding senses of windings $L_5$ and $L_7$ are such that the retrace pulses at the other end B have the positive polarity. When a transformer ratio of 1:1 is used, these pulses have the same amplitude as the pulses across winding $L_5$. A capacitor C is included between point B and point A to reduce the internal impedance of the high voltage source.

Figure 4:
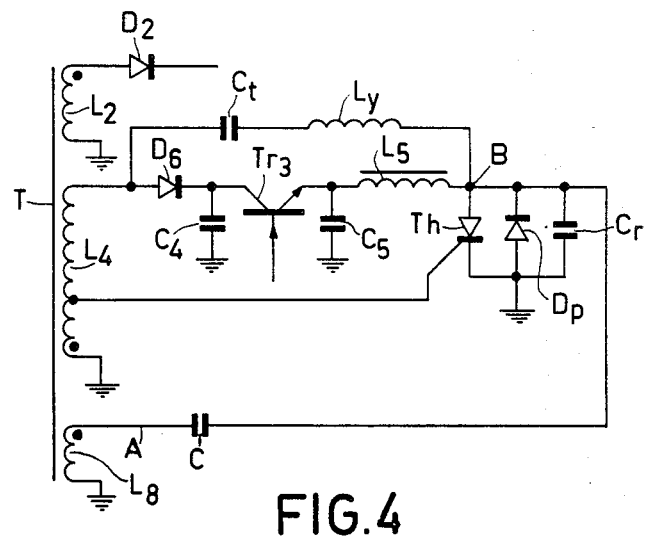
FIG. 4 shows a fourth embodiment of the picture display device circuit according to the invention.

The device shown in FIG. 4 does not comprise a transformer $T_1$ and the device is modified in some respects compared to FIG. 3. That end of winding $L_4$ which is at the top in this figure is connected to the anode of diode $D_6$, whose cathode is connected to capacitor $C_4$. The other end of winding $L_4$ is connected to ground. The junction of diode $D_6$ and capacitor $C_4$ is connected via the collector-emitter path of an npn-transistor $Tr_3$ to capacitor $C_5$, whose other end is connected to ground and to inductance $L_5$, whose other side is connected to switch Th, $D_p$ and to capacitor $C_r$. The other terminal of switch Th, $D_p$ and the other terminal of capacitor $C_r$ are connected to ground. One side of the series arrangement of capacitor $C_t$ and deflection coil $L_y$ is connected to that end of winding $L_4$ which is shown at top in the drawing and the other side to the junction B of elements $L_5$, $D_p$, Th and $C_r$. The loop mentioned in the description of FIG. 3 is present in FIG. 4, while diode $D_6$ and capacitor $C_4$ form a trace rectifying circuit together with winding $L_4$. Transistor $Tr_3$ receives a suitable signal for adjusting the picture width, causing a d.c. voltage and possibly a voltage of field frequency to be produced across capacitor $C_5$, which voltage is superimposed on the supply voltage from capacitor $C_4$.

A secondary winding $L_8$ of transformer T one end of which is connected to ground has such a winding sense that the retrace pulses at the other end A have the positive polarity. As winding $L_8$ is tightly coupled to winding $L_2$, the amplitude of the said retrace pulses decreases when the beam current within the picture display tube has a high value. Therefore, end A is connected to point B via capacitor C. During the retrace period energy is conveyed from the line deflection circuit to winding $L_8$ to compensate for the decrease of the high voltage. It will be obvious that in FIG. 3 as well as in FIG. 4 point A may be a tap on winding $L_2$.

In the embodiments shown in FIGS. 2, 3 and 4, the voltage source for the line deflection circuit is indeed derived from the voltage source for the power supply circuit, but the voltage thereof is substantially constant and is consequently affected only to a limited extent by variations of the beam current. Other, similar constructions are possible, for example, winding $L_1$, switch $Tr_1$, $D_1$, inductance L and switch $Tr_2$, $D_2$ can form a series arrangement which is connected between the terminals of a supply source, tuning capacitor $C_1$, as is also possible in FIG. 1, being arranged in parallel with winding $L_1$ and a smoothing capacitor being arranged between the junction of switch $Tr_1$, $D_1$ and inductance L and the negative terminal of the supply source. The connection according to the invention is then provided, for example between switch $Tr_2$, $D_2$ and a point of winding $L_2$ coupled to winding $L_1$.

Figure 5:
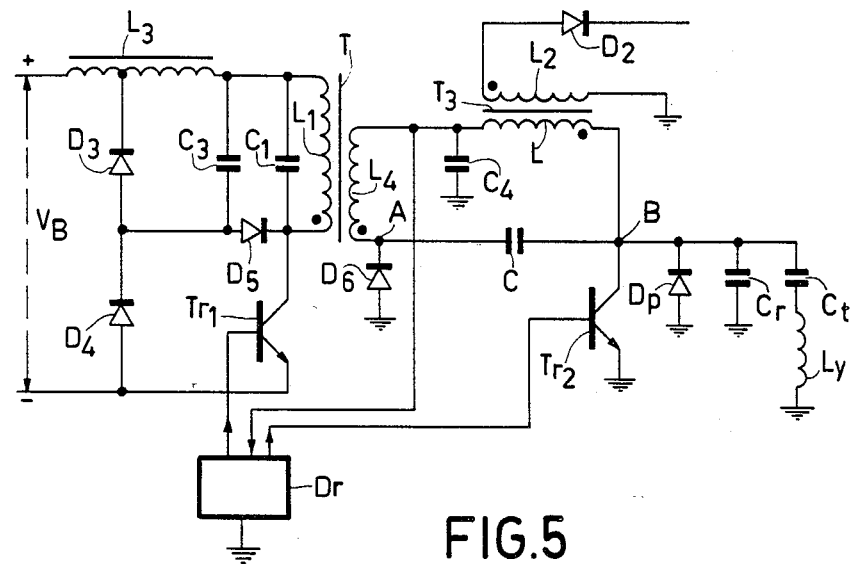
FIG. 5 shows a fifth embodiment of the picture display device circuit according to the invention.

In the embodiments described energy is applied in the retrace period by the line deflection circuit to the high voltage generator which is coupled to the power supply circuit. FIG. 5 shows an embodiment in which the high voltage generator is coupled to the line deflection circuit and the additional energy applied to this generator is obtained from the power supply circuit. FIG. 5 shows a large portion of FIG. 2 with the same reference symbols for the same components. Herein, inductance L provides the primary winding of a high voltage transformer $T_3$. The high voltage winding $L_2$ provides a secondary winding, not of supply transformer T but of transformer $T_3$. Connected to winding $L_2$ is rectifier $D_2$ for rectifying line flyback pulses and the high voltage generator formed has a high internal impedance. As the energy of capacitor $C_3$ is immediately available at the secondary side of transformer T and as the voltage of capacitor $C_4$ is substantially constant, the power supply circuit has, in contrast therewith, a low internal impedance. Therefore the same measure as used in FIG. 2 can be employed, i.e. providing a connection between points A and B, which onnection comprises a switch, conductive during the retrace period, for example a diode, or a capacitor C, the difference being however that the additional energy for winding $L_2$ is not conveyed from B to A but from A to B. The internal impedance of the high voltage source can be still further reduced if that terminal of capacitor C which is shown on the right is connected to a tap of winding $L_2$.

It will be obvious that the circuit at the primary side of transformer T may be of a different construction, provided winding $L_1$ is tuned to the line retrace period and that windings $L_1$ and $L_4$ carry current simultaneously.

Figure 6:
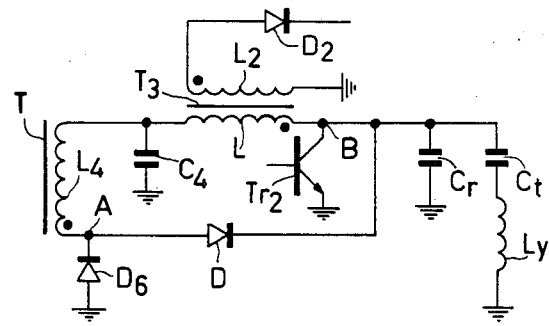
FIG. 6 shows a sixth embodiment of the picture display device circuit according to the invention.

If the connection according to the invention comprises a diode, this diode cannot be connected in FIG. 5 in the same way as in FIG. 2, because of the fact that the current through the diode during the time rectifier $T_2$ conducts must flow into the reverse direction. In FIG. 6 in which the primary side of transformer T is not shown, the said diode D is indicated. The cathode thereof is connected to point B and the anode to point A. Diode $D_p$ with which the series arrangement of diodes $D_6$ and D having the same conduction direction are arranged in parallel, may be omitted.

In both FIG. 5 and in FIG. 6 other windings can be provided on the cores of transformers T and $T_3$ for the benefit of trace and/or retrace rectifiers for applying supply energy to different portions of the picture display device. The generation of the high voltage by means of winding L then gives a degree of freedom in the design of the supply. Then, reducing the inductance of transformer T and increasing the capacitance of capacitor $C_1$ whilst maintaining the tuning to the retrace period results in a further decrease of the internal impedance of the high voltage source.

The embodiments of FIGS. 5 and 6 and variations, not shown, thereof are modifications of the embodiment of FIG. 2. In a similar manner variations of the embodiments of FIGS. 1, 3 and 4 can be utilized. In a modification of FIG. 3 high voltage winding $L_2$ is coupled to a winding which is included in the loop comprising elements $L_4$, $C_t$, $L_y$ and switch Th, $D_p$. In a modification of FIG. 4 winding $L_2$ is coupled to inductance $L_5$. Further variations can be proposed without departing from the scope of the invention.

What is claimed is:

1. A power supply and scanning line deflection circuit for a picture display device,
    said power supply circuit comprising the series arrangement of a first switch ($T_{r1}$) switchable at the scanning line frequency and a first inductance ($L_1$) connected between the terminals of a first voltage source, said first inductance forming part of a first resonant network during the cutoff period of said first switch;
    said deflection circuit comprising a line deflection coil ($L_y$) and, connected across the terminals of a second voltage source, the series arrangement of a second switch ($T_{r2}$) switchable at the scanning line frequency and a second inductance (L), the line deflection coil and the second inductance forming part of the second resonant network during the cutoff period of said second switch, the cutoff period of said second switch substantially coinciding with the scanning line retrace period;
    a transformer winding coupled to one of said inductances;
    a rectifying circuit including a rectifier connected to said transformer winding for rectifying pulses produced across such winding during the cutoff period of the one of said switches which is in series with the one of said inductances which is coupled to said transformer winding, such rectifying circuit generating from such rectified pulses a supply voltage for a load which may be connected thereto;
    and means for connecting said transformer winding to the other of said inductances, said connecting means being substantially non-conducting during the scanning line trace period but conducting during at least a portion of the scanning line retrace period to then supply a current to said other inductance which stabilizes the supply voltage produced by said rectifying circuit against variations in a load connected thereto.

2. A power supply and scanning line deflection circuit as claimed in claim 1, wherein said transformer winding is coupled to said first inductance and said connecting means connects said transformer winding to the junction of the second of said inductances and said second switch.

3. A power supply and scanning line circuit as claimed in claim 2, wherein the supply voltage generated by said rectifying circuit constitutes said second voltage source.

4. A power supply and scanning line circuit as claimed in claim 2, wherein one terminal of said transformer winding is connected to one terminal of a smoothing capacitor ($C_4$) comprised in said rectifying circuit, the supply voltage generated by said rectifying circuit being produced at such terminal of said smoothing capacitor; the other terminal of said transformer winding is connected to one electrode of the rectifier ($D_6$) comprised in said rectifying circuit, such rectifier conducting during the scanning line trace period; and the other terminal of said smoothing capacitor and the other electrode of said rectifier are interconnected together.

5. A power supply and scanning line deflection circuit as claimed in claim 1 wherein said connecting means comprises a controllable switch which is conductive during the scanning line retrace period.

6. A power supply and scanning line deflection circuit as claimed in claim 1 wherein said connecting means comprises a diode.

7. A power supply and scanning line deflection circuit as claimed in claim 1 wherein said connecting means comprises a capacitor.

8. A power supply and scanning line deflection circuit as claimed in claim 1 wherein the transformer winding is a high voltage winding and said rectifier is connected as a trace rectifier for generating the high voltage for the final anode of a cathode ray tube constituting said picture display device.

9. A power supply and scanning line deflection circuit as claimed in claim 1 wherein said load is a class B audio amplifier.

* * * * *